(12) United States Patent
Huonker et al.

(10) Patent No.: US 8,110,774 B2
(45) Date of Patent: Feb. 7, 2012

(54) LASER WELDING METHOD AND APPARATUS

(75) Inventors: Martin Huonker, Zimmern (DE); Peter Schaefer, Schramberg (DE)

(73) Assignee: Trumpf Laser GmbH + Co. KG, Schramberg (DE)

( * ) Notice: Subject to any disclaimer, the term of this patent is extended or adjusted under 35 U.S.C. 154(b) by 1098 days.

(21) Appl. No.: 11/176,581

(22) Filed: Jul. 8, 2005

(65) Prior Publication Data

US 2006/0006156 A1 Jan. 12, 2006

(30) Foreign Application Priority Data

Jul. 8, 2004 (EP) .................................... 04016048

(51) Int. Cl.
*B23K 26/26* (2006.01)
(52) U.S. Cl. ................................................. 219/121.64
(58) Field of Classification Search ............. 219/121.12, 219/121.6, 121.62, 121.63, 121.78, 121.79, 219/121.83, 125.1
See application file for complete search history.

(56) References Cited

U.S. PATENT DOCUMENTS

| | | | | |
|---|---|---|---|---|
| 5,533,146 A * | 7/1996 | Iwai | .............................. | 382/150 |
| 5,620,652 A * | 4/1997 | Tack et al. | ....................... | 420/532 |
| 5,681,490 A * | 10/1997 | Chang | ....................... | 219/121.64 |
| 5,772,814 A | 6/1998 | Grewell | | |
| 6,301,763 B1 * | 10/2001 | Pryor | ......................... | 29/407.04 |
| 6,670,574 B1 * | 12/2003 | Bates et al. | .............. | 219/121.64 |
| 2001/0017291 A1 * | 8/2001 | Bishop | ...................... | 219/121.63 |
| 2004/0182836 A1 * | 9/2004 | Becker et al. | ............ | 219/121.64 |
| 2004/0249495 A1 * | 12/2004 | Orozco et al. | ................ | 700/166 |

FOREIGN PATENT DOCUMENTS

| | | |
|---|---|---|
| DE | 196 35 843 | 3/1998 |
| EP | 1 238 744 | 9/2002 |
| JP | 2000167666 | 6/2000 |

OTHER PUBLICATIONS

Notice of Opposition and Brief from Siemens dated (Jan. 30, 2007), 9 pages.
Notice of Withdrawal of Opposition from Siemens (dated Oct. 4, 2007), 1 page.
Notice from European Patent Office regarding Withdrawal of Opposition (dated Nov. 19, 2007), 2 pages.
Communication from European Patent Office regarding terminating the Opposition and upholding the patent without amendment, (mailed Nov. 19, 2007), 4 pages.

* cited by examiner

*Primary Examiner* — Henry Yuen
*Assistant Examiner* — Thien S Tran
(74) *Attorney, Agent, or Firm* — Fish & Richardson P.C.

(57) ABSTRACT

A laser welding method includes providing a storage medium containing stored data about possible welding defects and associated repair welding parameters, welding a workpiece with a laser to produce weldings on the workpiece, monitoring the produced weldings for defective weldings, and, in response to detecting a defective welding from among the monitored weldings: comparing the defective welding with the stored data about possible welding defects; selecting repair welding parameters from among the associated repair welding parameters based on the comparison; and then performing a repair welding in a region of the detected defective welding in accordance with the selected repair welding parameters.

8 Claims, 1 Drawing Sheet

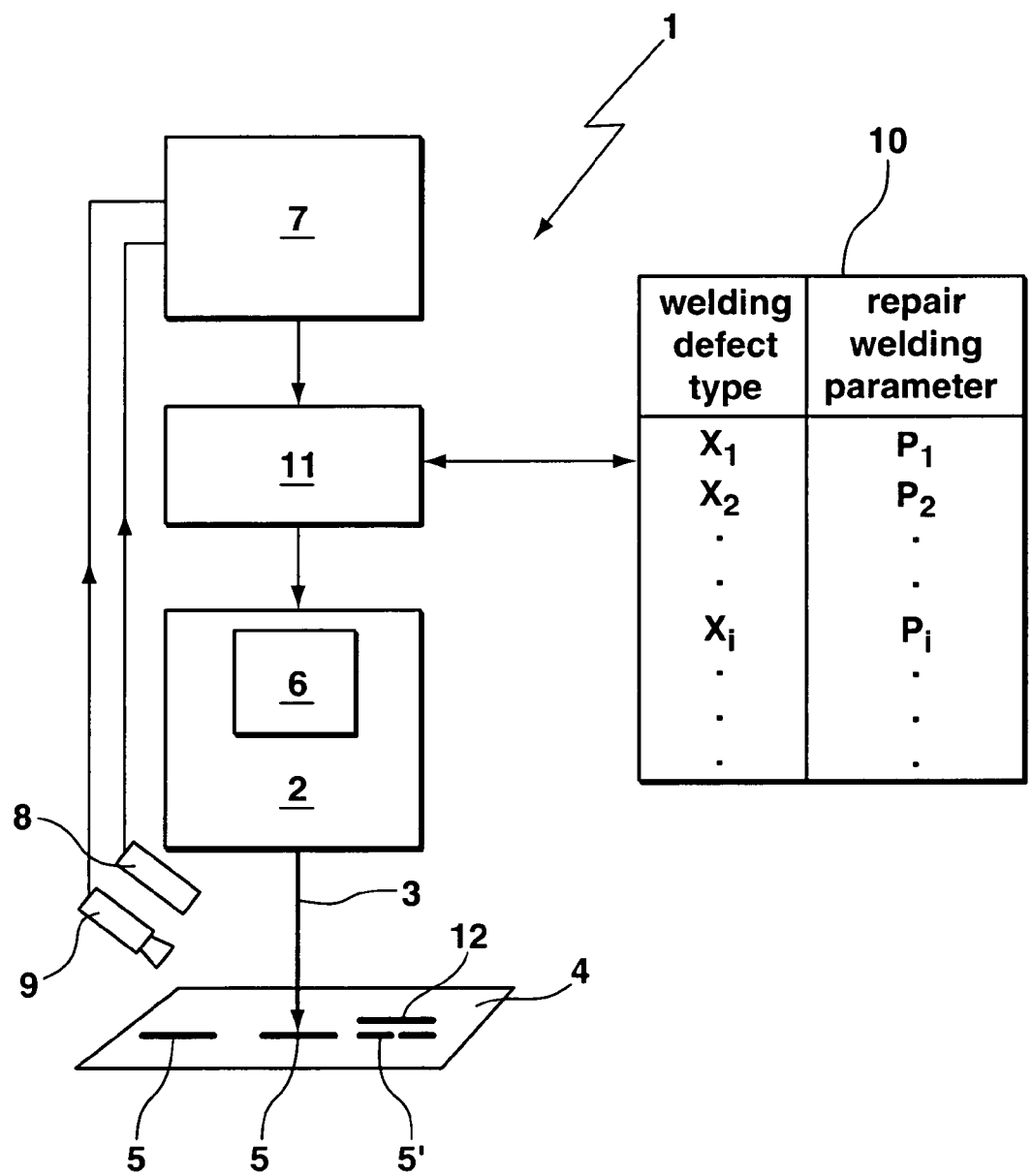

LASER WELDING METHOD AND APPARATUS

CLAIM OF PRIORITY

This application claims priority under 35 USC §119 to European Patent Application Serial No. 04 016 048.3, filed on Jul. 8, 2004, the entire contents of which are hereby incorporated by reference.

TECHNICAL FIELD

This disclosure relates to laser welding, and, in particular, to laser welding in which welds are monitored for welding defects.

BACKGROUND

A laser welding method and an associated device have been disclosed, for example, in German patent publication, serial number, DE 196 35 843 A1.

According to the above publication, for deep laser welding the material to be welded is locally heated to an evaporating temperature such that a steam capillary is formed in the workpiece due to the steam pressure. For generating the welding seam, the capillary is moved through the workpiece. The welding depth is determined by the extension in depth of the steam capillary in the material. Instabilities in the steam capillary can produce defects such as pores or bubbles. These defects that can occur during a laser welding process can be detected by a series of conventional methods and sensors. If a certain defect tolerance threshold has been exceeded, the defective component is characterized as a reject and is removed from the production process and is manually examined and subsequently either scrapped or repaired. For this reason, for example in motor vehicle body manufacture, the welding seams are overdetermined to prevent a component from being automatically rejected due to defective welding points.

The laser welding process is usually monitored by one of two different types of sensors: (1) light-sensitive detectors that can detect optical signals from the processing zone at different wavelengths, e.g., back reflected laser radiation and thermal radiation; and (2) camera systems that can be used for image recognition of the joining zone, in front of, within, and behind the effective area of the laser. Camera observation and light section methods permit analysis of the seam geometries.

For monitoring the laser welding process using light-sensitive sensors, a part of the processing light that is reflected by the workpiece back to the processing head or thermal radiation of the melting bath is decoupled, e.g., via beam splitters, and guided to the light-sensitive sensor. Alternatively, the sensor may be disposed outside of the laser beam next to the processing optics. Defined narrow frequency bands are detected and analysed. The intensity of the reflected radiation is a signal for the welding depth. The intensity of the reflected radiation greatly fluctuates in case of disturbances of formation of the welding seam and is an indicator of welding seam defects. The infrared emissions generated at the welding seam after welding may also give information about the welding seam quality.

Geometrical values such as the length, width, and position of the center of gravity of the melting bath and of the laser interaction zone, joint position, and steam capillary may also be determined from a camera image of the melting bath. The length or surface area of the melting bath gives information about the welding depth, since in case the laser beam penetrates deeper into the material, the melting bath length or surface area increases. Due to inclined mounting of the camera on the processing head, the process may be observed at a certain angle. A change in the focal position due to variation of the distance between the processing head and the workpiece can be clearly recognized in the camera image as displacement of the laser interaction zone.

In welding for serial production, the process signals are usually monitored and evaluated through a comparison with reference signals. Towards this end, the average reference signals are determined from some tested master weldings and are stored in the process control. Conditions are additionally determined according to which the likelihood of a welding defect is calculated from a deviation between the measured signals and the reference signals. If a certain signal limit is exceeded, a welding defect is detected and registered.

For example, the following types of welding defects can be detected in this manner:
  fluctuations of the welding depth;
  pores in the welding seam;
  eruptions to holes (important for galvanized sheet metals in the automotive industry);
  connecting defects of an I-seam at the overlap joints, where the gap is too large;
  positioning errors of a joint; and
  variations in the welding seam width.

The above-mentioned document, DE 196 35 843 A1, discloses a laser welding device, in which the quality of the welding seam is permanently monitored using a high-resolution control camera and an eddy current control sensor. If a welding defect is detected, the defective welding seam is re-welded using a second laser welding apparatus. The welding parameters for this additional welding are programmed via an impulse transmitter such that the image provided by the control camera shows a geometrically impeccable welding seam. However, re-welding cannot eliminate any welding defect that might occur during laser welding, with the consequence that the defective component must then be removed from the production process as a reject.

SUMMARY

Data about known welding defects and associated repair welding parameters, in particular, sets of repair welding parameters, can be pre-stored such that when a defective welding is detected and compared with data about known, stored welding defects and the comparison yields a positive result, a repair welding is performed in the region of the defective welding using the repair welding parameters associated with the detected welding defect. The detection of welding defects and the repair of such defects can minimize the occurrence of rejects in laser welding.

In a first general aspect, a laser welding method includes providing a storage medium containing stored data about possible welding defects and associated repair welding parameters, welding a workpiece with a laser to produce weldings on the workpiece, monitoring the produced weldings for defective weldings, and, in response to detecting a defective welding from among the monitored weldings: comparing the defective welding with the stored data about possible welding defects; selecting repair welding parameters from among the associated repair welding parameters based on the comparison; and then performing a repair welding in a region of the detected defective welding in accordance with the selected repair welding parameters.

Implementations can include one or more of the following features. For example, a position of the detected defective welding on the workpiece can be determined, data about the determined position of the defective welding can be stored in the storage medium and then a further welding can be produced on the workpiece, and then, after producing the further welding, the repair welding can be performed in the region of the detected defective welding. The plurality of weldings can be welded according to a welding program, and the repair welding can be preformed by re-running the welding program while switching on the laser only in the region of the defective welding. The weldings can be monitored by monitoring the temperature of the weldings. The weldings can be monitored by monitoring reflected process light from the weldings. The weldings can be monitored by monitoring an ultrasound wave reflected from the weldings. The weldings can be monitored by monitoring an image of the weldings.

In another general aspect, an apparatus for laser welding a workpiece includes a laser configured to weld the workpiece to produce weldings thereon, a defect monitor that monitors the produced weldings to detect defective weldings, a storage medium containing stored data about possible welding defects and associated repair welding parameters, a welding comparator that compares a detected defective welding with the stored data about possible welding defects and selects repair welding parameters based on the comparison, and a control unit that receives the selected repair welding parameters and controls the laser to perform a repair welding in accordance with the selected repair welding parameters.

Implementations can include one or more of the following features. For example, a the control unit can determine the location of defective weldings detected by the defect monitor. The control unit can store the determined location of the defective weldings in the storage medium. The defect monitor can include a light-sensitive detector. The defect monitor can include a camera.

The details of one or more implementations are set forth in the accompanying drawings and the description below. Other features will be apparent from the description and drawings, and from the claims.

DESCRIPTION OF DRAWINGS

The single FIGURE is a schematic diagram of a welding apparatus.

DETAILED DESCRIPTION

The device 1 which is schematically shown in the single FIGURE includes a laser welding apparatus 2 that produces weldings (e.g., welding seams) 5 and 5' on one or more workpieces 4 using a laser beam 3. The motion of the laser beam 3 on the workpiece 4 is controlled by a control unit 6 of the laser welding apparatus 2. The device 1 also includes a defect monitoring apparatus 7 that monitors the weldings 5 and 5' for welding defects using a light-sensitive detector unit 8 and/or a camera system (control camera) 9, a storage medium 10 that stores data about possible welding defects X1, X2, . . . along with associated sets of repair welding parameters P1, P2, . . . and a comparing apparatus 11 that compares a defective welding 5 detected by the defect monitoring apparatus 7 with the welding defects X1, X2 . . . stored in the storage medium 10.

A defect in the welding 5', for example, can be detected by the defect monitoring apparatus 7. The location of the defect is recorded by a location measuring apparatus in the control unit 6. In the comparing apparatus 11, the welding 5' is compared with the welding defects X1, X2, . . . stored in the storage medium 10. If the defective welding 5' corresponds, for example, to the stored defect X1, i.e., if the result is positive, the comparing apparatus 11 provides the control apparatus 6 with a repair welding parameter set associated with this detected welding defect, X1, and the control apparatus 6 performs a repair welding 12 corresponding to the set of repair welding parameters, P1, in the region of the detected welding defect 5'. As is shown in the FIGURE, this repair welding 12 may be a second welding that is performed at a defined lateral distance from the first welding 5'. If large holes are generated in the welding seam due to the defective welding 5', the repair welding 12 may be performed also using additional material.

Different sets of repair welding parameters or strategies, P1, P2, . . . , can be pre-defined in dependence on the possible welding defects X1, X2, . . . . The welding parameters can effect, for example, re-welding on the detected defective welding(s) 5', if required, with different power, speed, and focal position parameters that used in the initial welding. The sets of the repair welding parameters, P1, P2, . . . , can be stored in the laser and robot control unit 6 and can be automatically implemented. Examples of such repair welding strategies are listed in the following table, which also shows the detector type that is suited for detecting the respective welding defect:

| Detector type | Welding defect | Repair welding strategy |
|---|---|---|
| Detection of process light and back reflection | Insufficient welding depth | Re-welding with reduced welding speed or higher laser power |
| Detection of process light and back reflection | Welding depth spike formation | Re-welding of the defective seam |
| Detection of process lights and back reflection | Insufficient root formation | Re-welding with reduced welding speed or higher laser power |
| Image recognition | Positioning error of the seam position (joint not met) | new welding with corrected path coordinates −>correct contour |
| Image recognition, and detection of process lights and back reflection | Aluminium welding: melt eruptions | Since Al alloys are usually welded using an additional material, this additional material can close the erupted crater |
| Image recognition | Aluminium welding: insufficient end crater filling | Filling with additional wire |

-continued

| Detector type | Welding defect | Repair welding strategy |
|---|---|---|
| Image recognition, and detection of process lights and back reflection | Steel welding: melt eruptions in overlap joints of galvanized sheet metals (typically for welding motor vehicle bodies) | 2nd seam next to and parallel to the defective region ->enlargement of the connecting cross-section |
| Ultrasound | Pores in the seam region | re-welding with the same energy input per unit length and reduced welding speed for degassing ->time for degassing |
| Image recognition | Large surface roughness | re-welding with defocused beam and/or higher welding speed and/or reduced beam power ->seam smoothing |
| Image recognition | Undercuts | re-welding with defocused beam ->broader upper weld bead |
| Image recognition | Excess weld metal | re-welding with defocused beam ->broader upper weld bead re-welding with defocused beam |
| Image recognition | Abrupt transition between excess weld metal and basic material | ->broader upper weld bead |
| Image recognition | overlap (cold lapping) of cover layer | re-welding with additional material ->filling |

These various repair strategies can reduce or eliminate overdetermination of welding seams, which considerably reduces production costs. The repair welding is performed in the same system and setting as the main welding and can be automated.

The position of each defective welding 5' can be stored in the storage medium 10, and the repair weldings 12 can be performed only after termination of all other weldings. To repair the defects 5', either only the defective locations 5' may be addressed, or the full machine program can be run again and the laser switched on only in the region of the defective locations 5'.

The weldings 5 and 5' can be monitored for welding defects through measurement of temperature, ultrasound, or process light, or using image recognition, or combinations thereof.

The storage medium 10 can store data about possible welding defects, X1, X2, . . . , and associated repair welding parameters, P1, P2, . . . , in particular, sets of repair welding parameters. A comparing apparatus 11 can compare a defective welding 5' detected by a defect monitoring apparatus 7 with the data about welding defects stored in the storage medium 10. In case of a positive result of the comparison, the apparatus 7 can provide the repair welding parameters associated with the detected welding defect to a control apparatus 6 that is adapted to control the laser welding apparatus 2 to perform repair welding.

The control unit 6 of the welding device 2 can include a location measuring apparatus that registers the location of the defect 5' in case the defect monitoring apparatus 7 has detected a defective welding.

A number of implementations have been described. Nevertheless, it will be understood that various modifications may be made. Accordingly, other embodiments are within the scope of the following claims.

What is claimed is:

1. A laser welding method, the method comprising:
   providing a storage medium containing stored data about possible welding defects and associated repair welding parameters corresponding to different repair welding strategies, wherein the repair welding parameters comprise re-welding with reduced welding speed, re-welding with higher laser power, re-welding with reduced laser power, and re-welding with a defocused laser beam;
   welding a workpiece with a laser to produce weldings on the workpiece, wherein welding the workpiece comprises moving a laser processing beam along a predetermined path;
   monitoring the produced weldings for defective weld regions formed along the weldings; and,
   in response to detecting one or more defective weld regions formed along the monitored weldings:
      determining and storing a position of each of the one or more defective weld regions;
      comparing the one or more defective weld regions with the stored data about possible welding defects;
      selecting one or more repair welding parameters from among the associated repair welding parameters based on the comparison; and then
      moving the laser processing beam back to the position of each of the one or more defective weld regions and performing a repair welding along the one or more defective weld regions by moving the laser processing beam along a portion of the predetermined path including the one or more defective weld regions in accordance with the selected one or more repair welding parameters.

2. The method of claim 1, wherein the laser is switched on only in the region of the defective weld regions while performing the subsequent repair welding.

3. The method of claim 1, wherein the weldings are monitored by monitoring the temperature of the weldings.

4. The method of claim 1, wherein the weldings are monitored by monitoring reflected process light from the weldings.

5. The method of claim 1, wherein the weldings are monitored by monitoring an ultrasound wave reflected from the weldings.

6. The method of claim 1, wherein the weldings are monitored by monitoring an image of the weldings.

7. The method of claim 1, wherein the repair welding parameters further comprise re-welding with additional material.

8. The method of claim 1, wherein the repair welding parameters further comprise re-welding with higher welding speed.

* * * * *